United States Patent [19]

Koletzko

[11] Patent Number: 4,756,943

[45] Date of Patent: Jul. 12, 1988

[54] SANDWICH STRUCTURAL PART

[75] Inventor: Wolfram Koletzko, Kolbermoor, Fed. Rep. of Germany

[73] Assignee: Messerschmitt-Boelkow-Blohm GmbH, Munich, Fed. Rep. of Germany

[21] Appl. No.: 80,242

[22] Filed: Jul. 28, 1987

Related U.S. Application Data

[63] Continuation of Ser. No. 927,291, Nov. 4, 1986, abandoned.

[30] Foreign Application Priority Data

Nov. 14, 1985 [DE] Fed. Rep. of Germany ....... 3540352

[51] Int. Cl.$^4$ ................................................. B32B 3/12
[52] U.S. Cl. ...................................... 428/116; 52/806; 156/292; 428/408; 428/902
[58] Field of Search ........................... 52/806; 156/292; 428/116, 118, 408, 902

[56] References Cited

U.S. PATENT DOCUMENTS

| | | | |
|---|---|---|---|
| 3,272,686 | 9/1966 | Smith et al. | 428/116 |
| 3,679,384 | 7/1972 | Colson et al. | 428/116 X |
| 3,864,196 | 2/1975 | Schmidt | 428/118 X |
| 3,887,739 | 6/1975 | Kromrey | 428/112 |
| 4,014,147 | 3/1977 | Wesch | 428/116 X |
| 4,249,976 | 2/1981 | Hudson | 428/116 X |
| 4,330,659 | 5/1982 | King et al. | 528/99 |
| 4,578,303 | 3/1986 | Kundinger et al. | 428/116 |

Primary Examiner—Henry F. Epstein
Attorney, Agent, or Firm—Flynn, Thiel, Boutell & Tanis

[57] ABSTRACT

In order to achieve in a sandwich structural part 26 having a honeycomb-shaped support core 20 curved in tension-free condition, which is composed of individually hardened bonded-fiber profile pieces 10, a uniform form stability and a large surface preciseness over a wide temperature range, the individual bonded-fiber profile pieces are constructed tapering in a longitudinal direction of the profile and are octagonal in cross section and the profile walls 16.1, 16.2 of each profile piece are positioned substantially perpendicularly with respect to the local tangential plane T of the curved support-core surface and are exposed alternately peripherally of the profile and, with the mutually facing surfaces, are intended as a defined adhesion surface for a bonding agent 22 for effecting a coupling to an adjacent profile piece.

10 Claims, 2 Drawing Sheets

SANDWICH STRUCTURAL PART

This application is a continuation of U.S. Ser. No. 927,291, filed Nov. 4, 1986, now abandoned.

FIELD OF THE INVENTION

The invention relates to a sandwich structural part having an upper and a lower cover layer between which is located a honeycomb shaped member.

BACKGROUND OF THE INVENTION

Known sandwich structural parts of this type (German OS 33 15 246 corresponding to U.S. Pat. No. 4,578,303) having a honeycomb-shaped support core with a curved surface contour glued tension-free between the cover layers, which support core consists of individually hardened bonded-fiber pipe pieces glued together in a parallel arrangement, are particularly suited in cases where, aside from its own weight which is low with reference to the stiffness characteristic, an exact high-grade contour and stable form of the structural part surface during temperature variations are important. Such a use is, for example, a radio telescope mirror of more than 10 m. in diameter, which is composed of several sandwich structural parts each forming a parabolic mirror segment, which must maintain under significant temperature differences a uniform degree of high surface exactness. Due to the anisotropic heat expansion and solidity characteristics of the bonded-fiber pipe pieces and their linelike bonding to one another without a defined adhesion surface, it is possible in these known sandwich structural parts for an incomplete material utilization and local distortions of the structural part surface to result which, even though of a very small order of magnitude, do not meet the strict demands for example placed on the mentioned mirror segments.

Sandwich structural parts with a hexagonal aluminum honeycomb core are furthermore known, which core must be elastically deformed corresponding to the curvature of the structural part and must be glued under inherent tension between the cover layers in order to maintain its honeycomb webs each perpendicular with respect to the local structural part curvature, and furthermore has a honeycomb core structure nonuniform in longitudinal and width direction of the structural part. The surface exactness of such sandwich structural parts at greater temperature differences is low in comparison to the very narrow tolerances (approximately 1 $\mu$m) permitted in the mentioned cases.

The purpose of the invention is to provide a sandwich structural part such that a very high surface exactness and stability of shape over a wide temperature range can be achieved.

The bonded-fiber hollow profile pieces of the support core are, in the inventive sandwich structural part, each individually pyramidally preformed and hardened such that the profile walls of each profile piece in the support core extend substantially perpendicularly with respect to the curved surface. The support core forms a honeycomb-shaped bonded-fiber structure curved without any elastic deformation with a heat expansion and solidity behavior which is quasihomogeneous in the thickness direction of the structural part, so that the demand for the highest surface exactness (approximately 1 $\mu$m) over a wide temperature range (for example $-50°$ to $+100°$ C.) can be fully met.

In view of a further comparison of the solidity characteristic and heat expansion behavior of the honeycomb-shaped bonded-fiber structure, all hollow profile pieces are constructed of the same length, thus the cover layers are equally spaced from one another by the support, and the individual adhesion areas between the profile pieces have also at the same time over the entire support core the same dimensions in thickness direction of the structural part.

The thermal stability of the shape and surface precision of the sandwich structural part is also clearly improved: The individual bonded-fiber hollow profile pieces are connected to the adjacent profile pieces each through defined, flat adhesion surfaces, between which in each case is provided a free profile wall provided with openings for facilitating ventilation of the honeycomb structure, with the characteristic that the honeycomb structure, due to the special form and arrangement of the surface for the adhesive bonding of the profile pieces, does not have a preferred direction, but has a completely symmetrical design in both the longitudinal and width directions. This guarantees a defined, uniform heat expansion of the honeycomb structure and a high-grade stability in the shape of the structural part surface over a wide temperature range.

In view of a single-part production of the profile pieces, which production is favorable with respect to manufacture and at the same time is suitable with respect to load and material, these are manufactured preferably through a winding method having a crossing fiber arrangement, whereby the profile walls in a further development are provided right away, during the winding operation through a suitable placement of the reinforcing thread, with openings needed for facilitating the ventilation of the honeycomb structure. For a single-part production of both pyramidally tapered and also octagonal bonded-fiber honeycombs, the winding mandrel is advantageously utilized. If the cover layers, for example in the above-mentioned case of a radio telescope mirror, are manufactured of ceramic material, then it is advisable to wind the individual bonded-fiber honeycomb forming members of carbon fibers, whereby the fiber orientation is chosen such that the thermal expansion coefficient of the honeycomb profile pieces corresponds with the thermal expansion coefficient of the ceramic material.

BRIEF DESCRIPTION OF THE DRAWINGS

The invention will be described exemplarily with reference to the drawings, in which.

DETAILED DESCRIPTION

Figure 1:
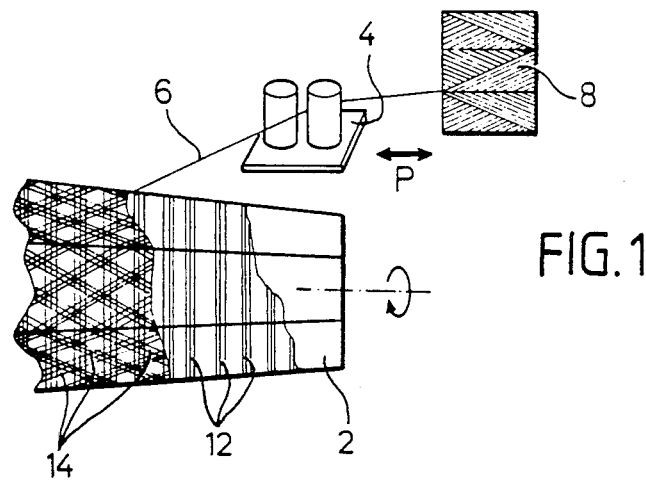
FIG. 1 schematically illustrates a conically tapered winding mandrel, octagonal in cross section, for the manufacture of a bonded-fiber hollow profile piece having a profile wall built of several wound layers.
Figure 2A:
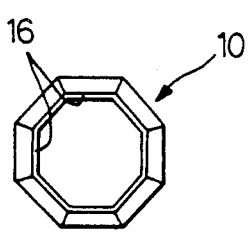
FIGS. 2a and 2b are a top view and a longitudinal cross-sectional view, respectively, of the profile piece according to FIG. 1.

As is illustrated in FIG. 1, a uniformly pyramidally tapered, rotating, metallic winding mandrel 2 having a regular octagonal cross section has continuously wound thereupon a bonded-fiber thread 6, for example a resin-impregnated carbon filament with the help of a thread guide 4 moving back and forth in the directions of the arrow, in several layers from a spool 8 such that the fiber orientation in the individual wound layers, in consideration of the volume of fiber in the finished bonded-fiber profile piece 10 (FIG. 2), results in a predetermined solidity and a defined heat-expansion coefficient in direction of the winding mandrel axis, thus in a longitudinal direction of the profile. FIG. 1 indicates a three-layer laminate construction with an inner wound layer 12 having a winding angle of almost 90° with respect to the profile longitudinal axis, a middle wound layer 14 having a winding angle of ±30°, and an outer wound layer (not illustrated) having a winding angle of also approximately 90°.

Figure 2B:
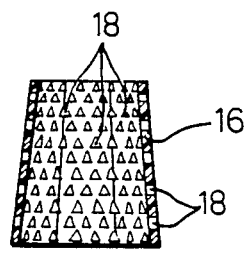

FIG. 1 shows furthermore, that the winding mandrel 2 is wound with a nonuniform thread density, that is, gaps are maintained between the thread windings which otherwise lie closely side-by-side, so that after the hardening and unmolding of the hollow profile piece 10, there remains a plurality of open areas in the form of fine openings 18 substantially evenly distributed in the profile walls 16 (FIG. 2b).

Figure 3:
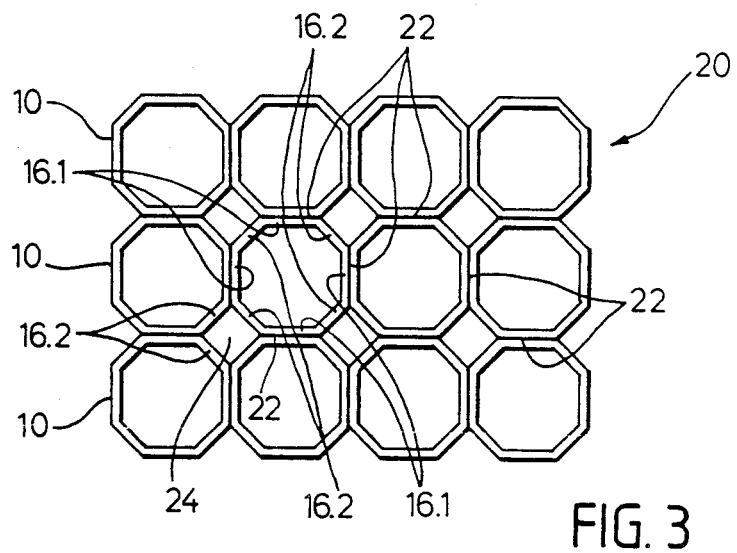
FIG. 3 is a bonded array of several individual profile pieces forming a honeycombed support core.

A support core 20 is composed, according to FIG. 3, of similar profile pieces 10 which have been individually premanufactured in this manner. The support core 20 has a design which is completely symmetrical in the longitudinal and width directions, whereby each hollow profile piece 10 forms a single complete octagonal honeycomb forming member, which is connected to the adjacent honeycomb forming members through mutually facing flat surfaces and bonding agent 22. The outer sides of the four profile walls 16.1 of each profile piece 10 are intended as defined large adhesion surfaces for the bonding agent 22, while the remaining four profile walls 16.2, which alternately occur in peripheral direction around the profile piece 10 with respect to the profile walls 16.1, are kept free. The exposed profile walls 16.2, through which nonblocked openings 18 extend, define with their outer sides spaces 24 which are square in cross section. The outer sides of the profile walls 16.2 of all individual honeycomb forming members of the support core 20 are connected with one another. This assures an undisturbed pressure balance or a ventilation of the entire honeycomb structure in the finished structural part.

Figure 4:
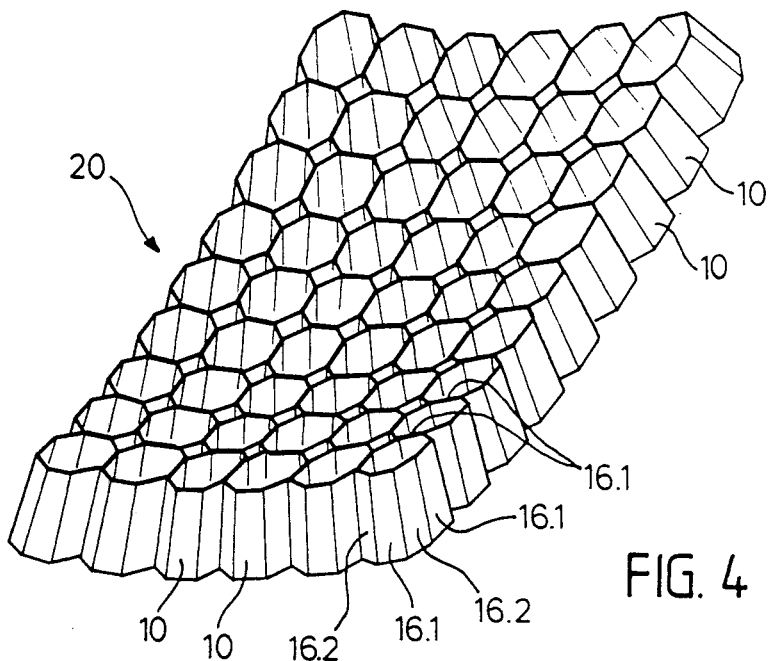
FIG. 4 is a partial perspective illustration of a support core composed of individual honeycomb forming members in the form of a pyramidally tapered, octagonal hollow profile pieces, said support core having a three-dimensionally curved surface contour.

FIG. 4 shows a partial perspective illustration of a support core 20 composed of similar, pyramidally tapered octagonal hollow profile pieces 10 forming a three-dimensionally curved contour, namely, a partial spherically shaped surface contour. Support cores having other surface contours are composed of hollow profile pieces which do also have an octagonal cross section and the same profile length, however, have different cone angles. This means that winding mandrels 2 are needed to manufacture the profile pieces 10, the outer surfaces of which winding mandrels 2 are inclined at different angles with respect to the winding mandrel axis.

Figure 5:
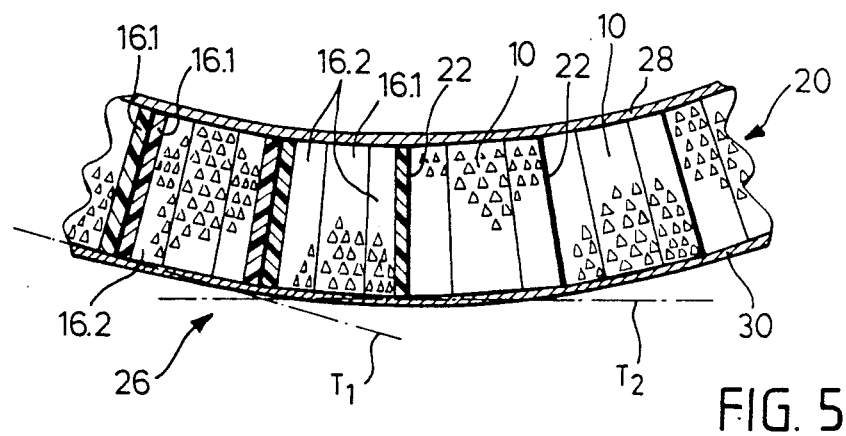
FIG. 5 is a partial cross-sectional view of a sandwich structural part with the support core according to FIG. 4.

A sandwich structural part 26 is finished (FIG. 5) by adhesively securing to the upper and the lower ends of each profile piece 10 cover layers 28, 30, which are spaced equally from each other over the entire support core 20. The profile walls 16 and the flat bonding agent 22 extend substantially perpendicularly with respect to the local tangential plane, as this is shown in FIG. 5 for the local tangential plane $T_1$ and the associated profile walls 16.1 and for the tangential plane $T_2$ and the associated bonding agent 22. The heat expansion coefficient of the profile pieces 10 in a longitudinal direction of the profile piece, thus in a direction of the structural part thickness, is maintained in the abovedescribed manner, namely, by suitably winding on the winding mandrel 2, equal with the heat expansion coefficient of the cover-layer material. In the case of a telescope mirror, the cover layers 28, 30 consist preferably of a ceramic material.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a sandwich structural part comprising an upper and a lower cover layer and a honeycomb-shaped support core with a curved surface contour glued between said cover layers in a tension-free condition, which support core is composed of a plurality of individually hardened and upright profile pieces made of a bonded-fiber material, which profile pieces are bonded together by a bonding agent, the improvement comprising wherein said profile pieces are hollow and are premanufactured, tapering in longitudinal direction of said hollow profile piece, each hollow profile piece having plural profile walls, each extending substantially perpendicularly with respect to a local tangential plane of the curved surface contour of the support-core, wherein said hollow profile pieces are octagonal in cross section, said profile walls thereof in said support core being alternately free of connection to an adjacent profile piece and adhesively secured to an adjacent profile piece through mutually facing flat surfaces, so that the mutually adjacent profile walls that are free of connection define spaces.

2. A sandwich structural part according to claim 1, wherein the length of said hollow profile pieces and said bonding agent are substantially constant in direction of the structural part thickness over the entire support core.

3. A sandwich structural part according to claim 1, wherein said hollow profile pieces are manufactured with crossing fiber orientation during a winding process.

4. A sandwich structural part according to claim 1, wherein said hollow profile pieces are wound with openings formed between reinforcing fibers.

5. A sandwich structural part according to claim 1, wherein said hollow profile pieces are manufactured with the help of a uniformly tapered winding mandrel having a regular octagonal winding mandrel cross section.

6. A sandwich structural part according to claim 1, wherein said cover layers are manufactured of a ceramic material and said hollow profile pieces are manufactured of a bonded carbon fiber material having a fiber orientation adjusted to the thermal expansion coefficient of the ceramic material.

7. A sandwich structural part according to claim 1, wherein said mutually adjacent profile walls have openings therethrough.

8. A sandwich structural part according to claim 1, wherein all profile walls have openings therethrough.

9. In a sandwich structural part comprising an upper and a lower cover layer and a honeycomb-shaped support core with a curved surface contour glued between said cover layers in a tension-free condition, which support core is composed of a plurality of individually hardened and upright profile pieces made of a bonded-fiber material, which profile pieces are bonded together by a bonding agent, the improvement comprising wherein said profile pieces are hollow and are premanufactured, tapering in longitudinal direction of said hollow profile piece, each hollow profile piece having profile walls extending substantially perpendicularly with respect to a local tangential plane of the curved surface contour of the support core.

10. In a sandwich structural part comprising an upper and a lower cover layer and a honeycomb-shaped support core between said cover layers, which support core is composed of a plurality of individually hardened and upright profile pieces made of a bonded-fiber material, which profile pieces are bonded together by a bonding agent, the improvement comprising wherein said profile pieces are hollow and are premanufactured, being octagonal in cross section, said profile walls thereof in said support core being alternately free of connection to an adjacent profile piece and adhesively secured to an adjacent profile piece through mutually facing flat surfaces, so that the mutually adjacent profile walls that are free of connection define spaces.

* * * * *